UNITED STATES PATENT OFFICE.

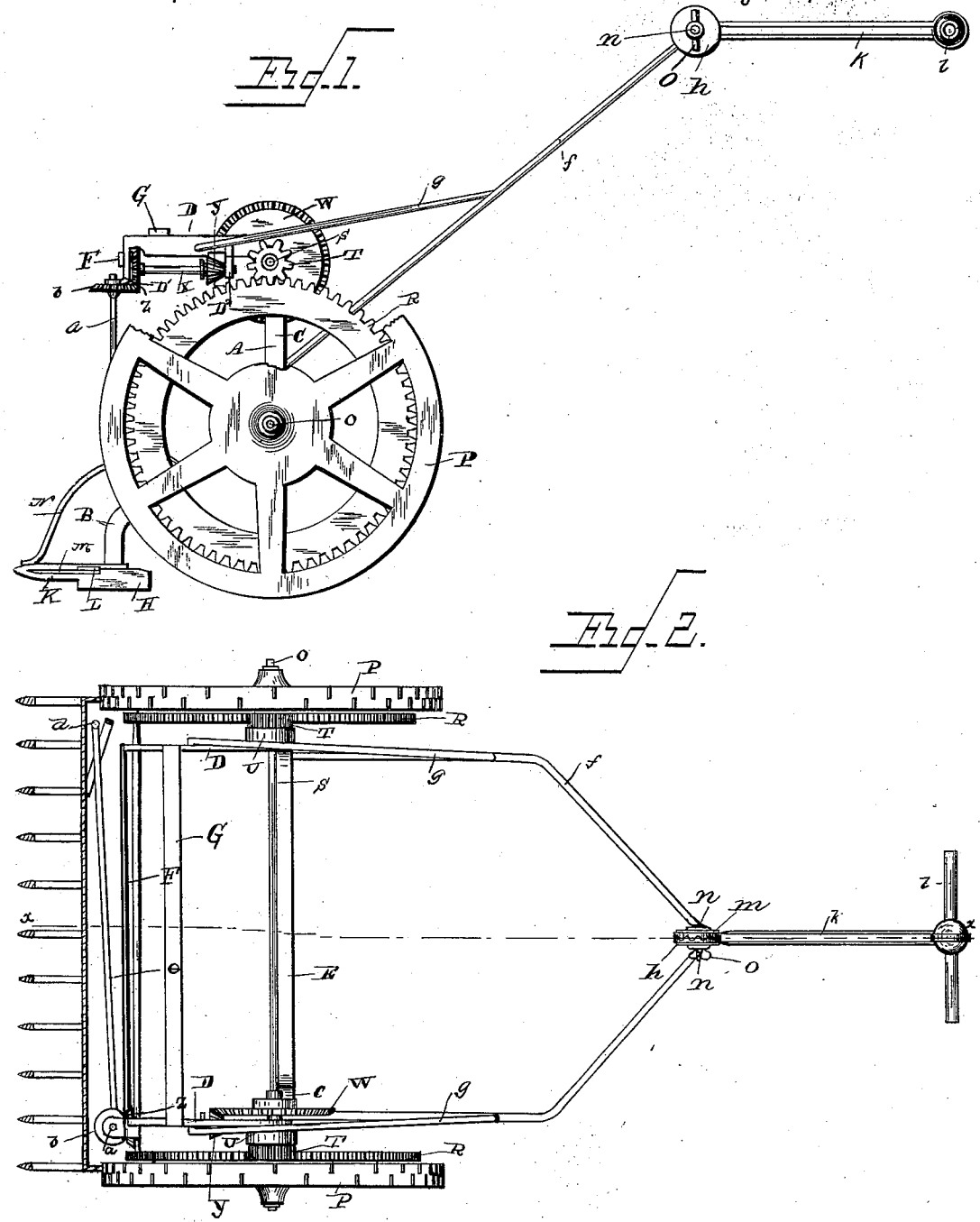

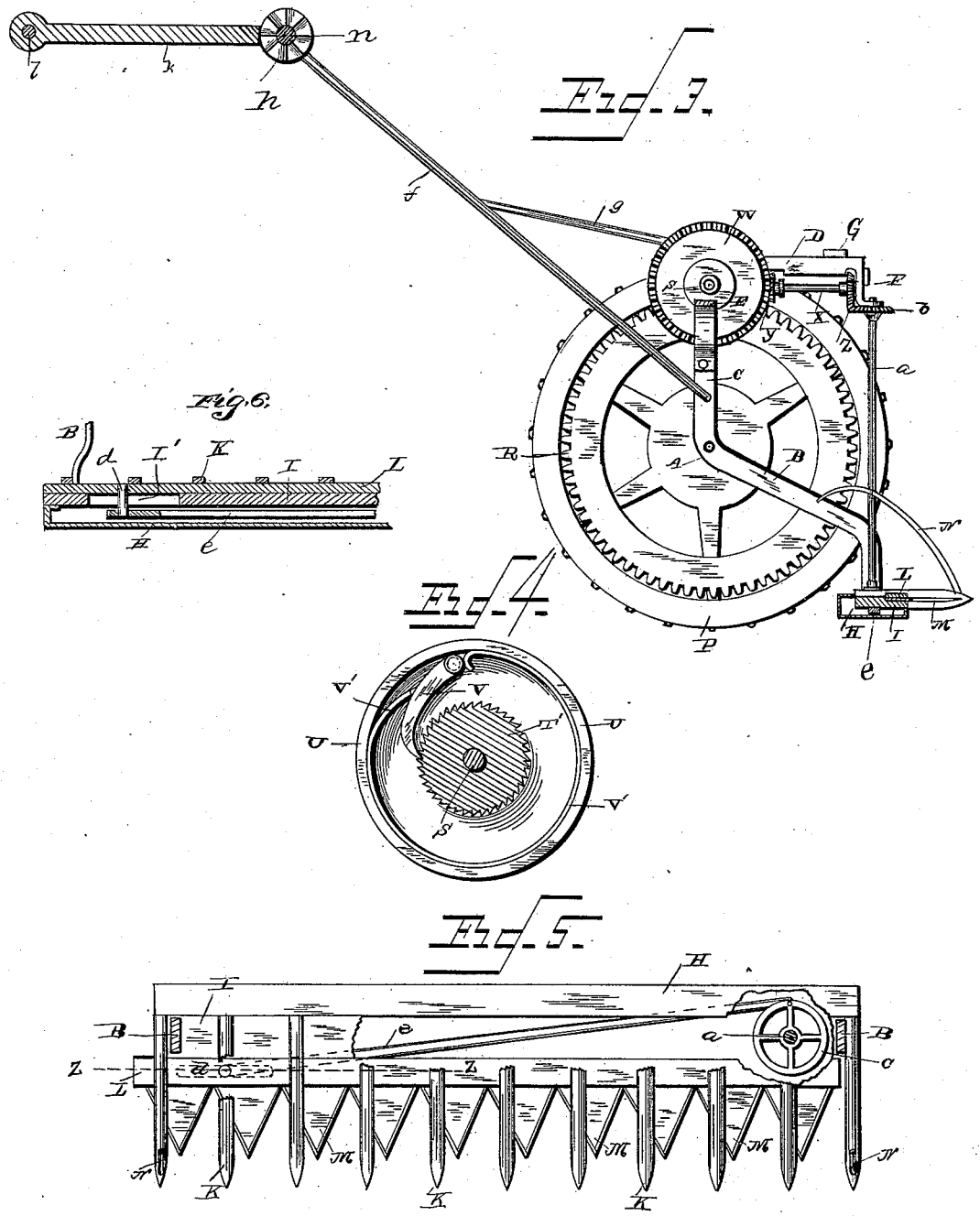

JESSIE F. POWELL, OF EUREKA, KANSAS.

LAWN-MOWER.

SPECIFICATION forming part of Letters Patent No. 362,535, dated May 10, 1887.

Application filed July 6, 1886. Serial No. 207,219. (No model.)

*To all whom it may concern:*

Be it known that I, JESSIE F. POWELL, a citizen of the United States, residing at Eureka, in the county of Greenwood and State of Kansas, have invented a certain new and useful Improvement in Lawn-Mowers; and I hereby declare that the following is a full, clear, and exact description of the invention, such as will enable others skilled in the art to which it appertains to make and use the same, reference being had to the accompanying drawings.

My invention relates to an improvement in lawn-mowers; and it consists in the peculiar construction and combination of devices, that will be more fully set forth hereinafter, and particularly pointed out in the claims.

In the drawings, Figure 1 is a side elevation of a lawn-mower embodying my improvement. Fig. 2 is a top plan view of the same, partly in horizontal section. Fig. 3 is a vertical longitudinal sectional view taken on the line $x\ x$ of Fig. 2. Fig. 4 is a detailed elevation of one of the disks on the main shaft, the latter and the ratchet-collar of one of the drive-pinions being shown in section. Fig. 5 is a detailed top plan view, with parts being broken away, of the cutting mechanism. Fig. 6 is a vertical longitudinal sectional view of the cutting mechanism, taken on the line $z\ z$ of Fig. 5.

A represents the sides of the frame, which have the forward and downward inclined arms B, the vertical standards C, and the forwardly-extending horizontal arms D at the upper ends of the standards. These standards are connected near their upper ends by a horizontal cross-bar, E. A cross-bar, G, connects the arms D forward of the cross-bar E.

One of the arms D has its front end bent downward in a vertical direction, forming a bracket, D', and a vertical bracket, D², also depends from the said arm, near its rear end.

To the lower ends of the arms B is attached a transverse finger-bar, I, provided with the fingers K. An inclosing-case, H, which is made of sheet metal, is secured on the under side of the finger-bar. On the upper side of the finger-bar is a reciprocating cutter-bar, L, having the usual cutters, M, the sides of which are inclined to a point at their front ends. The cutters and the cutter-bar work in slotted openings in the guard-fingers, so that the said cutter-bar and cutters are maintained in position on the finger-bar. To the front ends of the outer fingers are attached rearward and upward extending guards, N, which are inclined inward toward each other, and serve to force the grass at the sides of the swath inward onto the ends of the cutting mechanism.

From the sides A of the frame, from the junction of the arms B with the standards C, project outward-extending spindles O, on which are mounted driving and supporting wheels P. The said wheels are provided on their inner sides with the spur-teeth R.

S represents a transverse shaft, which is journaled in bearings in the upper ends of the standards C. On the outer ends of the said shaft are loosely-mounted spur-pinions T, which mesh with the spur-teeth of the wheels P, and are provided on their inner sides with annular collars having ratchet-teeth T'. Disks U are rigidly attached to the shaft S, and pawls V are pivoted to the said disks to engage with the ratchet-teeth of the pinions, and rotate them with the shaft S when the machine is pushed forward, and when the machine is backed the pinions slip idly on the shaft S and do not rotate the latter. Springs V' bear against the pawls to keep them engaged with the ratchet-teeth. Near one end of the shaft S is rigidly attached a miter-wheel, W.

X represents a horizontal shaft, that is journaled longitudinally in the brackets D' and D². At the inner end of this shaft is a miter-pinion, Y, that meshes with the miter-wheel W, and at the front end of the shaft X is a miter-wheel, Z.

$a$ represents a vertical shaft journaled in one end of the case H and in the lower end of the bracket D'. At the upper end of this shaft is a miter-pinion, $b$, that meshes with the wheel Z, and to the lower end of the said shaft is attached a crank-wheel, $c$, that rotates in the case. A pin, $d$, depends from the end of the cutter-bar opposite the end of the case in which the wheel $c$ is located, and this pin works in a longitudinal slot, I', made in the finger-bar, and is connected to the crank-wheel by a pitman, $e$. The shaft S is rotated by the forward motion of the machine, as before described, and the rotation thereof is communicated to the shaft $a$ through the gears W, Y, Z, and $b$, thereby causing the crank-wheel to rotate and reciprocate the cutter-bar.

$f$ represents a bent yoke, which has the front ends of its arms attached to the standards C, the said yoke extending rearward and upward from the frame. Brace-rods $g$ connect the arms of the yoke and the arms D of the frame to strengthen the yoke. To the rear side of the yoke, at the center thereof, is attached a circular block or disk, $h$. K represents a push-rod, which is provided at its rear end with a transverse handle, $l$, to enable it to be readily grasped. To the front end of the said push-rod is attached a circular disk or block, $m$, that bears against one side of the disk $h$, and is pivoted upon a bolt, $n$, that extends through both disks. By this means the push-rod is pivotally connected to the yoke, and may be adjusted up or down to suit the height of the person using the machine. A thumb-nut, $o$, is screwed on the threaded end of the bolt $n$, and by tightening the said nut the disks $h$ and $m$ may be clamped firmly together to secure the push-rod at any desired adjustment.

It will be noted that the front end of the machine may be elevated to any desired height by the operator, thus adapting the machine to cut grass at any height desired.

Having thus described my invention, I claim—

1. In the cutting mechanism of a lawn-mower, the combination of the inclosing-case, the finger-bar thereon having the slot, the cutter-bar working on the finger-bar and having the pin projecting through the slot, the rotating crank-wheel in the case, and the pitmen connecting the same with the pin of the finger-bar, substantially as described.

2. The combination, in a lawn-mower, of the frame having the finger-bar at its front end and the driving-wheels at its sides, provided with gears R, the transverse shaft S, having the pinions meshing with the gears R, and the miter-wheel W, the longitudinal shaft X, having the miter-pinion Y, meshing with wheel W, and provided also with the miter-wheel Z, the vertical shaft $a$, having the miter-pinion $b$, meshing with wheel Z, and having the crank-wheel at its lower end, and the cutter-bar on the finger-bar, the latter having the slot I', substantially as described.

JESSIE F. POWELL.

Witnesses:
 IRA P. NYE,
 J. C. NYE.